(12) United States Patent
Ichikawa et al.

(10) Patent No.: US 7,612,287 B2
(45) Date of Patent: Nov. 3, 2009

(54) STRUCTURE AND METHOD FOR STOPPING WATER IN SHIELDED ELECTRIC WIRE

(75) Inventors: Hidehiro Ichikawa, Shizuoka (JP); Kouichi Yamamoto, Shizuoka (JP); Shigemi Hashizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/723,225

(22) Filed: Mar. 19, 2007

(65) Prior Publication Data

US 2007/0215374 A1    Sep. 20, 2007

(30) Foreign Application Priority Data

Mar. 17, 2006    (JP)    ............................. P2006-073849

(51) Int. Cl.
*H02G 15/02*    (2006.01)
(52) U.S. Cl. ...................... 174/77 R; 174/93
(58) Field of Classification Search .................. 174/93, 174/77 R, DIG. 8
See application file for complete search history.

(56) References Cited

U.S. PATENT DOCUMENTS

| | | | | |
|---|---|---|---|---|
| 4,237,174 A | * | 12/1980 | Lagardere et al. ............. | 428/99 |
| 4,434,320 A | * | 2/1984 | Klein et al. ................ | 174/23 R |
| 4,500,371 A | * | 2/1985 | De Groot ...................... | 156/48 |
| 4,532,164 A | * | 7/1985 | Claunch et al. ............. | 428/34.9 |
| 4,732,412 A | * | 3/1988 | van der Linden et al. ..... | 285/47 |
| 5,347,090 A | * | 9/1994 | Cerda ........................ | 174/84 R |
| 5,786,053 A | * | 7/1998 | Andrenacci et al. ......... | 428/36.9 |

FOREIGN PATENT DOCUMENTS

| | | |
|---|---|---|
| JP | 2002-203656 A | 7/2002 |
| JP | 2004-072943 A | 3/2004 |
| JP | 2004-355851 A | 12/2004 |

* cited by examiner

*Primary Examiner*—Chau N Nguyen
(74) *Attorney, Agent, or Firm*—Sughrue Mion, PLLC

(57) ABSTRACT

To simply provide a water-stopping structures for shielded electric wire in the shielded portion of the wire at a low cost, a water stop structure in a shielded electric wire is comprised by stripping a sheath 4 of the shielded electric wire in the middle part thereof; permeating an adhesive into the exposed shield member 3; overlaying a heat shrinkable tube 12 over the shield member via hot melt 14; and heat shrinking the heat shrinkable tube 12 in a state where both ends of the heat shrinkable tube 12 are overlapped with the outer periphery of the sheath 4.

5 Claims, 4 Drawing Sheets

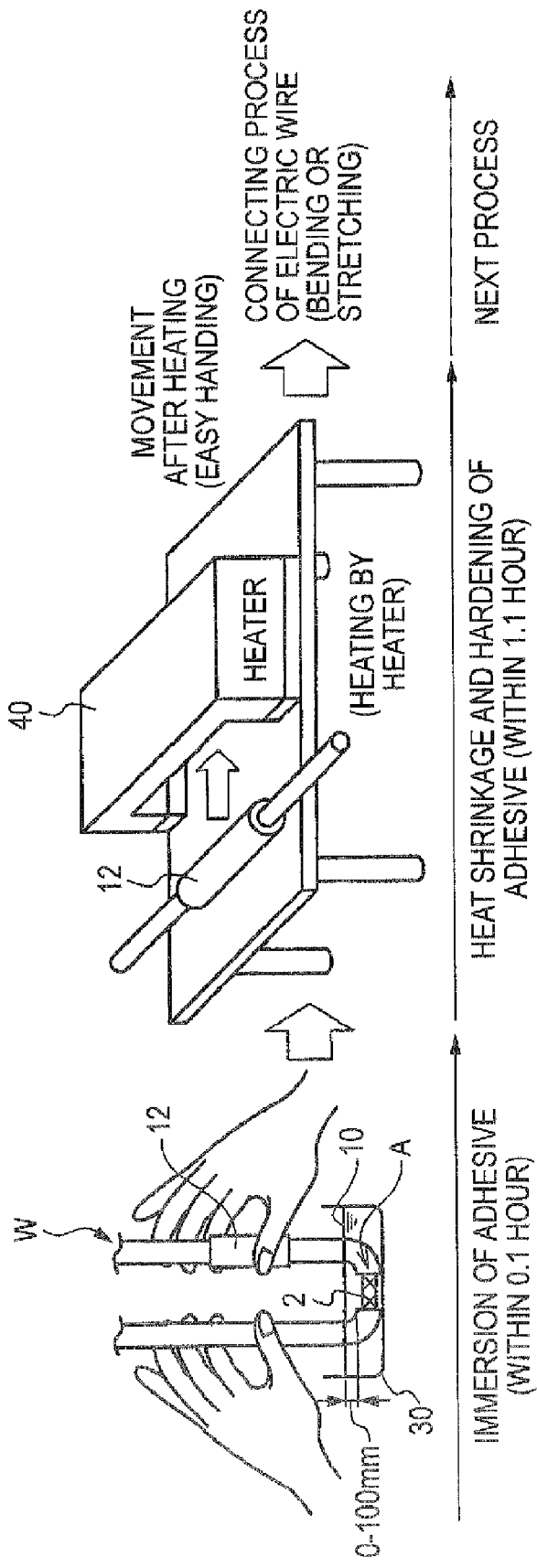

STRUCTURE AND METHOD FOR STOPPING WATER IN SHIELDED ELECTRIC WIRE

BACKGROUND OF THE INVENTION

1. Field of the Invention

The present invention relates to a structure and method for stopping water in a shielded electric wire.

2. Description of the Related Art

It is known that a structure for stopping water infiltrations through the gaps inside the covering material in a electric wire by permeating an adhesive having a flow ability into the inside of the covering material which covers core of wire and hardening the adhesive.

In this case, for example, as described in JP-A-2004-355851, the adhesive is surely permeated into a wide area by supplying the adhesive from one end of the electric wire and drawing out air from the covering material from the other end of the electric wire.

However, in case of stopping water in the shielded electric wire in which a shielding member (braid, metal foil, and networked brace metal, etc.) surrounding the core at an inner side of an outer shell (sheath) is arranged, the water stopping of the shield member should be considered as well as the water stopping of the core, but since an adhesive is simply applied onto the exposed part of the shield member in the past, it is not possible to obtain effective permeation of the adhesive into the shield member, and sufficient water stopping ability may not be attained.

Meanwhile, a technique which draws out air from a terminal other than the supplying side of the adhesive is proposed, but there exist problems in that air drawing equipment is required, and the operation is difficult, so it does not meet cost conditions.

SUMMARY OF THE INVENTION

The invention has been made to solve the above problems and an advantage to provide a structure and method for stopping water in a shielded electric wire in a simple and reliable with low cost.

A water stop structure in a shielded electric wire according to a first aspect of the invention is comprised by stripping a sheath of the shielded electric wire in the middle part thereof; permeating an adhesive into the exposed shield member; overlaying a heat shrinkable tube over the shield member via hot melt; and heat shrinking the heat shrinkable tube in a state where both ends of the heat shrinkable tube are overlapped with the outer periphery of the sheath.

A method of water stop in a shielded electric wire according to a second aspect of the invention includes stripping a sheath of the shielded electric wire in the middle part; permeating an adhesive into a shielded electric wire exposed by the middle stripping; overlaying a heat shrinkable tube over the middle striped part via hot melt; overlapping both ends of the heat shrinkable tube with the outer periphery of the sheath; and heat shrinking the heat shrinkable tube.

In a third aspect of the invention according to the second aspect, the adhesive may be permeated into the shield member exposed by the middle stripping by immersing the middle stripped part into the adhesive contained in a container.

According to the first aspect of the invention, by the heat shrinkage of the heat shrinkable tube, while applying a pressure, since it is possible to permeate the adhesive into the shield member and harden the adhesive, the sufficient application of adhesive onto the required portions is possible. Moreover, since the adhesive is hardened in a pressurized state, bonding is surely performed. In particular, since it is possible to bury the gaps of heat shrinkable tube with the shielded electric wire by the hot melt, not only it is possible to permeate an adhesive uniformly into the shield member, but also it is possible to reliably block the water stopping part from the outside. As a result, water stopping ability can be reliably ensured for a long time, and the infiltrations of moistures through the shield member can be blocked.

In addition, since the water stopping part is protected by the heat shrinkable tube, it is possible to increase durability. Moreover, since resistance to the thermal expansion due to the temperature change or the external force is exhibited, it is possible to avoid the shape collapse thereof by keeping the shape of the hardening adhesive, and the handling of the shielded electric wire is easily performed while maintaining high water stop ability.

In addition, since it is only configured such that the heat shrinkable tube is shrunken by the hot melt and the heat shrinkable tube at the state where the exposed part (water stopping part) of the shield member is covered, difficult water stopping process can be performed with simple equipment. In addition, since the water stopping is performed in the middle of the shield member, cumbersome water stopping of the shield member by the connectors installed at the terminal is not required.

According to the second aspect of the invention, since the water stopping structures in the first aspect of the invention can be easily obtained without using air drawing-out equipment of high cost, it is also possible to obtain the effect of the first aspect of the invention. In addition, it is possible to shorten the hardening time of the adhesive in accordance with a kind of adhesive when the temperature of the heat shrinkable tube increases.

According to the third aspect of the invention, since the infiltrations of the adhesive onto the shield member is performed by permeating the stripped part into the adhesive contained in a container, it is possible to apply sufficient amount of adhesives onto the shield member for a short time with simple equipment.

BRIEF DESCRIPTION OF THE DRAWINGS

FIG. 1 is a schematic view of an embodiment of the water stop structure of the shielded electric wire of the present invention, in which, FIG. 1a shows a cross sectional view on a state before shrinking a heat shrinkable tube, and FIG. 1b shows a cross sectional view on a state after the shrinking of the heat shrinkable tube.

FIG. 2 is a detailed sectional view of the FIG. 1a.

FIGS. 4a and 4b are explanatory views of the water stop structure of the shielded electric wire according to the embodiment of the invention

DESCRIPTION OF THE PREFERRED EMBODIMENTS

Hereinafter, embodiments of the invention will be described with reference to the accompanying drawings.

Figure 1:
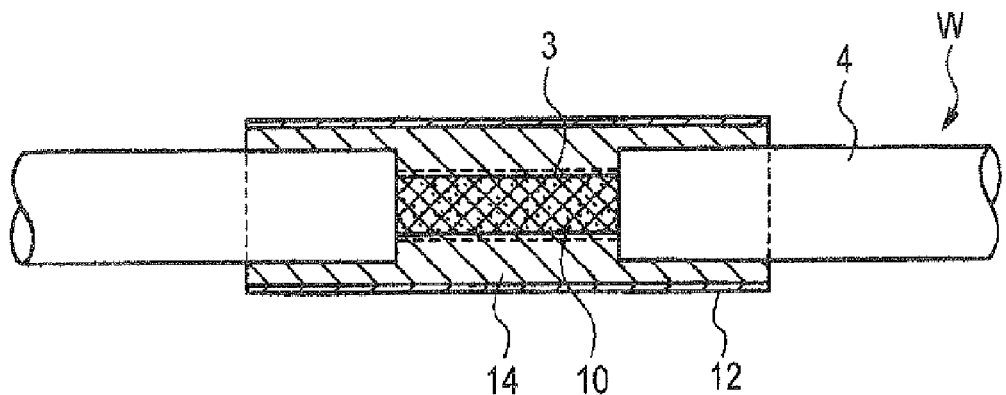
Figure 1:
Figure 1:
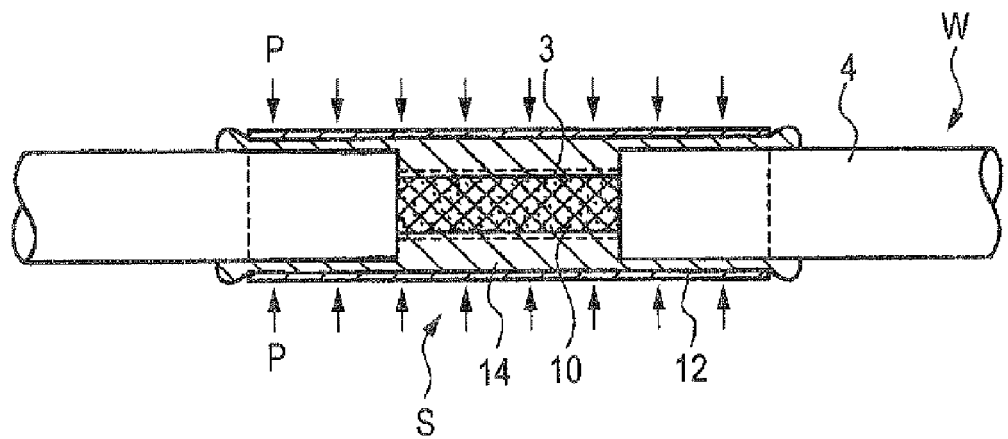
Figure 2:
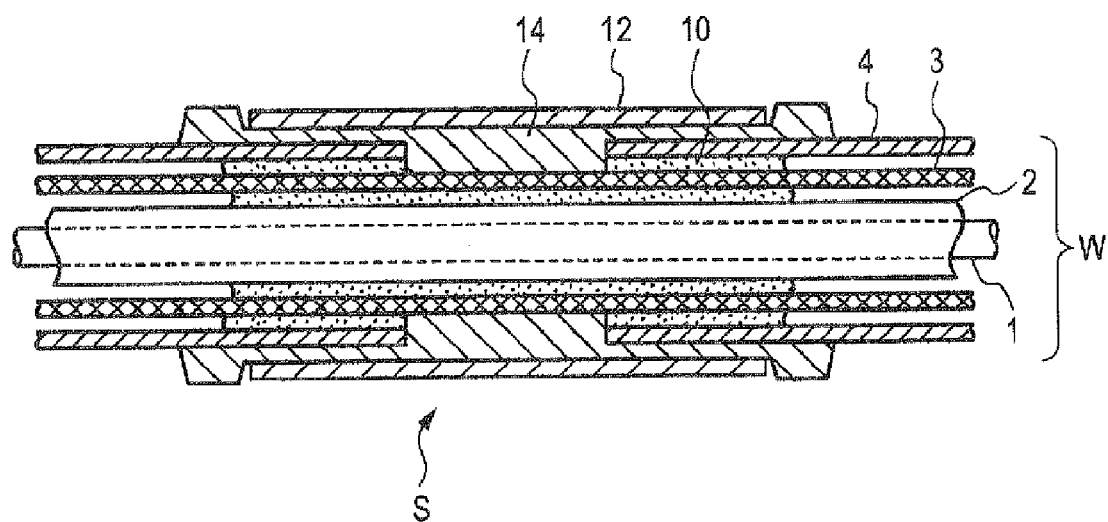
Figure 3:
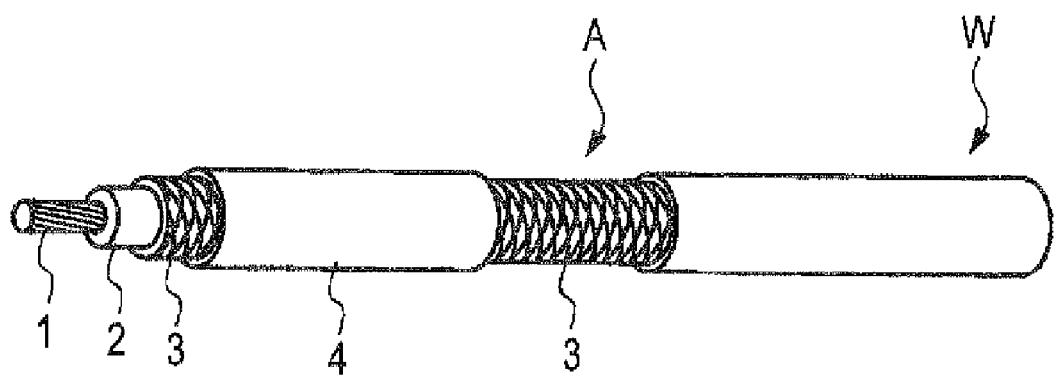
FIG. 3 is a perspective view of the stripped portion of the shielded electric wire.

FIG. 1 is a schematic view of an embodiment of the water stop structure of the shielded electric wire, in which, FIG. 1a shows a cross sectional view on a state before shrinking a heat shrinkable tube, and FIG. 1b shows a cross sectional view on a state after the shrinking of the heat shrinkable tube, FIG. 2 is a detailed sectional view of the FIG. 1a, FIG. 3 is a perspective view of the stripped portion of the shielded electric wire, and FIGS. 4a and 4b are explanatory views of an embodiment of the water stop structure of the shielded electric wire.

To obtain the water stopping structures of the embodiment, at first, as shown in the FIG. 3, from the structures of shielded electric wire, which comprising a core 1, an insulating layer 2, a shield member 3 (braid, metal foil, and networked brace metal, etc.), and a sheath 4 are arranged in this order, and the middle of the sheath 4 is stripped (first step).

Next, as shown in the FIG. 1a, adhesive 10 with flow ability is permeated into the shield member 3 exposed by stripping the middle of the sheath (the second step). In addition, a heat shrinkable tube 12 is overlay over the exposed part via hot melt 14, and both ends of the heat shrinkable tube 12 and the outer periphery of the sheath 14 are overlapped and kept in this state (the third step). Then, at this state, the heat shrinkable tube 12 is shrunken (the fourth step). For this reason, shrinkage of heat shrinkable tube 12 is performed, and water stopping structure S is obtained as shown in the FIG. 1b and FIG. 2.

At this time, for example, as shown in the FIG. 4a, in the second step, since the middle stripped part A is immersed into the adhesive 10 in a container 30, the adhesive 10 onto the exposed part is permeated. Furthermore, as shown in the FIG. 4b, in the fourth step, since the covered heat shrinkable tube 12 is located under the heater 40, heat shrinkage of the heat shrinkable tube 12 is performed by maintaining the environment temperature to a predetermined temperature.

In the water stop structures described above, as shown in the FIG. 1b, while applying a pressure P by the heat shrinkage of the heat shrinkable tube 12, since it is possible to harden the adhesive 10 permeated into the shield member 3, the adhesives 10 can be applied sufficiently on the required portions. Moreover, since the adhesive 10 is hardened at the state where the pressure is applied, reliable bonding can be performed.

In particular, since it is possible to bury the gap between the heat shrinkable tube 12 and the shielded electric wire W by the hot melt 14, it is possible to permeate an adhesive 10 uniformly into the shield member 3. At this time, it is also possible to reliably block the water stopping part S from the outside. As a result, since water stopping ability can be attained reliably for a long time, the infiltrations of moistures through the shield member can be blocked.

In addition, since the water stopping part S is protected by the heat shrinkable tube 12, the durability can be increased. Since resistance to the thermal expansion due to the temperature change or the external force is exhibited by tightening of the heat shrinkable tube 12, it is possible to keep the hardening shape of the adhesive 10 and to avoid the shape collapse thereof. Furthermore, while maintaining high water stop ability, the handling of the shielded electric wire W is easily performed.

Furthermore, since it is only configured such that the heat shrinkable tube 12 is shrunken by the hot melt 14 and the heat shrinkable tube 12 at the state where the exposed part (water stopping part) of the shield member 3 is covered, difficult water stopping process can be performed with simple equipment without using the prior art cost-high air drawing-out equipment. Therefore, it is possible to prohibit the increase of cost. In addition, since the water stopping is performed in the middle of the shield member W, cumbersome water stopping of the shield member W by the connectors installed at the terminal of the wire is not required.

Furthermore, it is possible to shorten the hardening time of the adhesive 10 when the temperature of the heat shrinkable tube 12 increases (at the time of heat shrinkage) in accordance with a kind of adhesive. For example, in the case of adhesive of cyanoacrylate series, after increasing the temperature up to 80° C., and the hardening can be performed within 1 hour. Moreover, in the case where the infiltrations of the adhesive 10 onto the shield member 3 is performed by permeating the middle stripped part A into the adhesive 10 in the container 30, it is possible to provide sufficient amount of adhesives onto the shield member for a short time with simple equipment.

Consequently, as shown in the FIGS. 4a and 4b, since an adhesive is immersed within 0. 1 hour, the heat shrinkable tube 12 is shrunken within 0. 1 hour, and the adhesive is hardened within 1. 1 hour, it is possible to shorten the work time.

In addition, considering on the factors which affecting the water stopping ability, it is preferable that repeat the experiments and find out the best condition by the adjusting the ratio of shrinkage, viscosity of the adhesive 10 or hot melt 14, and other conditions (the width of the stripped off middle part and amount of wrap (length of the heat shrinkable tube) etc.).

What is claimed is:

1. A water stop structure, comprising:
    a shielded electric wire including a sheath and an exposed shield member where the sheath is stripped in the middle part thereof;
    a hardened adhesive permeated into the shield member such that the adhesive is provided outside, inside, and within the shield member;
    a hot melt directly contacted with the adhesive and the exposed shield member;
    a heat shrinkable tube overlaying the shield member via the hot melt located between the adhesive and the tube;
    wherein the heat shrinkable tube is heat shrunk in a state where both ends of the heat shrinkable tube are overlapped with the outer periphery of the sheath so that the heat shrinkable tube presses the hot melt.

2. The water stop structure according to claim 1, wherein the hot melt is located between the adhesive and the tube and between the sheath and the tube.

3. A method of water stop in a shielded electric wire including a sheath and a shield member, comprising the steps of:
    stripping the sheath of the shielded electric wire in the middle part;
    permeating an adhesive into the shield member exposed by the middle stripping such that the adhesive is provided outside, inside, and within the shield member;
    overlaying a heat shrinkable tube over the middle stripped part via hot melt located between the adhesive and the tube so that the hot melt directly contacts the adhesive and the shield member;
    overlapping both ends of the heat shrinkable tube with an outer periphery of the sheath; and
    heat shrinking the heat shrinkable tube to apply a pressure to the hot melt, thereby further permeating and hardening the adhesive.

4. The method according to claim 3, wherein the hot melt is located between the adhesive and the tube and between the sheath and the tube.

5. A method of water stop in a shielded electric wire including a sheath and a shield member, comprising the steps of:
    stripping the sheath of the shielded electric wire in the middle part;
    permeating an adhesive into a shield member exposed by the middle stripping such that the adhesive is provided outside, inside, and within the shield member;

overlaying a heat shrinkable tube over the middle stripped part via hot melt located between the adhesive and the tube so that the hot melt directly contacts the adhesive and the shield member;

overlapping both ends of the heat shrinkable tube with an outer periphery of the sheath; and heat shrinking the heat shrinkable tube, wherein the adhesive is permeated into the shield member exposed by the middle stripping by immersing the middle stripped part into the adhesive contained in a container.

* * * * *